3,088,839
POLYMER COATINGS CONTAINING A TERTIARY TRIDECANOIC ACID
Donald H. Antonsen, Wilmington, Del., Anthony H. Gleason, Scotch Plains, and Marlow H. Paulson, Jr., Fanwood, N.J., and Walter L. Van Nostrand, Jr., Staten Island, N.Y., assignors to Esso Research and Engineering Company, a corporation of Delaware
No Drawing. Filed June 27, 1961, Ser. No. 119,777
9 Claims. (Cl. 106—287)

This invention relates to an improved coating composition and improved film therefrom and more particularly to a method for increasing the impact resistance of an oxidized polymeric film.

The preparation of a liquid polymer of a $C_4$ to $C_6$ conjugated diolefin with subsequent chemical modification to incorporate oxygen in its structure is known in the art. In the past, this oxidized polymeric oil has been applied to the surface of a material and cured to provide a film thereon. However, it has been found that the impact resistance of the cured film is relatively poor. Therefore, a serious problem occurs in certain instances where the aforementioned characteristic is of paramount importance.

It has now been discovered that the impact resistance of the film can be substantially improved by incorporating in the oxidized polymer a zinc salt of a tertiary tridecanoic acid.

Thus, in accordance with one embodiment of this invention a polymer of a $C_4$ to $C_6$ conjugated diolefin is prepared and subsequently oxidized by blowing it with air. This oxidized polymer is subsequently mixed with the aforementioned zinc salt to provide a coating composition. A film of the admixture is then applied to the surface of a material, e.g., a metal plate, and cured to provide a coating with increased impact resistance.

Polymeric oils included in this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization should boil between about −15° C. and 200° C., and may be used in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having an —O—C—O grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference.

These polymeric drying oils are then oxidized by blowing them with air or oxygen, preferably in the presence of a solvent, such as aromatic solvents or solvent mixtures having a kauri butanol value of at least 40. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octoates, and oleates are especially suitable. These catalysts are used in amounts ranging from 0.001% to 1.0%. The nature of the oxidized diolefin polymer largely depends upon the type of original polymerization and the extent of oxidation, which is dependent upon various factors as time, temperature, catalyst, and solvent. Preferred compounds are the oxidized copolymers of 75 to 85% butadiene and 25 to 15% styrene with about 10 to 20% oxygen in the structure.

In accordance with this invention 2 to 15% of a zinc salt of a tertiary tridecanoic acid is added to the oxidized polymer to provide a coating composition having improved impact resistance. The amount used to achieve the desired impact resistance will vary depending upon the amount of oxygen in the polymer. For those polymers containing 10% oxygen, the amount can be between 2 and 15% with 5 to 15% preferred, while for those polymers containing 20% oxygen, the amount may be between 2 and 10% with 10% preferred.

The tertiary tridecanoic acids can be prepared in accordance with the teachings of U.S. Nos. 2,831,877 and 2,876,241. According to these patents carboxylic acids are obtained by reacting olefins with carbon monoxide in the presence of catalysts such as sulfuric acid or hydrogen fluoride or the like. As a particular example, isododecene can be reacted with carbon monoxide in the presence of the complex phosphoric-acid-monohydroxy fluoboric acid catalyst. The C-13 acids obtained by this method which are suitable for use in this invention are those having a neopentyl carbon, i.e. those having a carbon atom directly connected to four other carbon atoms, e.g.

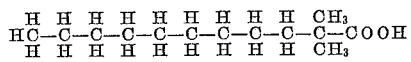

These acids may be pure or a mixture of any or all possible isomers.

The zinc salt of this acid can be prepared by known methods. For example, the free acids or their esters may be heated with a zinc salt or zinc oxide. Another method consists in precipitating the zinc salt by mixinng a water soluble solution of an alkali metal soap of the acids and a water solution of a zinc salt.

A mixture comprising the oxidized polymer and the zinc salt of a tertiary tridecanoic acid is the improved coating composition of this invention which is adapted to provide a film with increased impact resistance. This coating composition can be applied to the surface of a material, such as a metallic item, e.g., tin plate, by any known method which, therefore, includes spraying, brushing, dipping, and the like. The thickness of the coating can vary over a wide range, but, generally, it will be between 0.2 and 0.4 mils. The admixture, which has been applied to the surface, can be cured in accordance with any suitable method known in the art. A preferred method is by baking in an oven at a temperature between 250° and 500° F. for 60 to 3 minutes, respectively. Other methods include infrared baking, electronic induction baking, flame curing, air drying, curing in the presence of $SO_2$, and the like.

Thus, in accordance with this invention an improved end product has been formed which forms a film having vastly improved impact resistance. It is thus possible to coat refrigerators, cans, automobiles, and kitchen appliances and provide a film having the relatively high impact resistance necessary for this use.

The following examples are submitted to illustrate but not to limit this invention.

EXAMPE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene–100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the nonvolatile portion thereof had an average molecular weight of about 4,000.

A polymeric solution was then provided in a reactor comprising 35 weight percent of the above copolymer in Solvesso 100 (high percentage of aromatics with an API gravity of 30.2, a flash point of 118° C., and a boiling range of 322°–351° F.). The solution was blown with oxygen for 2 hours and 15 minutes at 240° F. in the presence of 0.01 weight percent of manganese as the naphthenate soap as a catalyst to incorporate 10% oxygen (A) in the structure of the copolymer. The solution with the oxidized polymer therein was stripped at a temperature of 220°–240° F. and a vacuum of 20 mm. Hg to provide a product of 50% NVM. A similar product was prepared containing 16% oxygen (B).

Various amounts of the zinc salt of a mixture of tridecanoic acids prepared from isomeric propylene tetramers, carbon monoxide and water were added to 100 parts of each of the aforementioned oxidized polymeric solutions (A) and (B). Each of these admixtures was applied by spraying a one mil coating on a polished steel plate and cured at 350° F. for 30 minutes. The impact resistance was measured on a Gardner variable impact tester (rating with 30× magnification) as indicated in Table I.

Table I

| Composition, Wt. Percent | | | | Hardness | | |
|---|---|---|---|---|---|---|
| Percent oxidized 10% $O_2$ | polymer 16% $O_2$ | Percent Zn salt | Thickness | Sward | Pencil | Reverse Impact (inch-lb.) |
| 100 | | | 1.0 | 54 | 3H | 5 |
| 98 | | 2 | 1.0 | 44 | 2H | 60 |
| 95 | | 5 | 1.0 | 36 | 2H | >160 |
| 90 | | 10 | 0.8 | 40 | 2H | >160 |
| 85 | | 15 | 0.7 | 34 | H | >160 |
| 80 | | 20 | 0.8 | 28 | F | 85 |
| | 100 | | 1.0 | 46 | 4H | 5 |
| | 98 | 2 | 1.0 | 56 | 4H | 30 |
| | 95 | 5 | 0.9 | 60 | 3H | 30 |
| | 90 | 10 | 0.8 | 56 | 3H | >160 |
| | 85 | 15 | 0.9 | 54 | 3H | >5 |
| | 80 | 20 | 0.8 | 38 | H | >5 |

EXAMPLE II

An appliance primer containing 25% pigment by volume was prepared from the folowing formulations:

Table II

| | Compn. A (gms.) | Compn. B (gms.) | Compn. C (gms.) |
|---|---|---|---|
| $TiO_2$ (RA–NC) | 150 | 150 | 150 |
| Lithopone | 307 | 307 | 307 |
| Oxidized Polymer (10% $O_2$) (50% NVM) | 650 | 586 | 584 |
| Toluene | 19.5 | 19.5 | 19.5 |
| Zinc salt of Tridecanoic acids | | 32.5 | |
| Zinc Naphthenate (Nuodex 8% Zn—65% NVM) | | | 53.5 |

Films were prepared from the resulting mixture as in Example I and cured for thirty minutes at 350° F. The following results were obtained:

Table III

| | Cure | | (a) | (b) | (c) | (d) | (e) |
|---|---|---|---|---|---|---|---|
| | Time (min.) | Temp. (° F.) | | | | | |
| Composition A | 30 | 350 | 1.0 | | 7H | 10 | 2 |
| Composition B | 30 | 350 | 1.0 | | 5H | 50–70 | 8 |
| Composition C | 30 | 350 | 1.0 | | 5H | 20–50 | 8 |

(a) Thickness (mils.)
(b) Sward hardness.
(c) Pencil hardness.
(d) Reverse impact.
(e) Detergent resistance, 1% tide at 150° F.—days to failure.

EXAMPLE III

An appliance primer similar to that of Example II (25% pigment by volume) was prepared from the oxidized polymer of Example I, containing 16% oxygen in accordance with the following formulations:

Table IV

| | Compn. A (gms.) | Compn. B (gms.) | Compn. C (gms.) |
|---|---|---|---|
| $TiO_2$ (RA–NC) | 150 | 150 | 150 |
| Lithopone | 307 | 307 | 307 |
| Oxidized polymer (16% $O_2$) (42.4% NVM) | 775 | 699 | 688 |
| Zinc salt of tridecanoic acids | | 32.7 | |
| Zinc naphthenate | | | 53.5 |

Films laid down from the above composition after curing for thirty minutes at 350° F. had the following properties:

Table V

| | Film Thickness (mls.) | Hardness | | Reverse Impact (inch lbs.) |
|---|---|---|---|---|
| | | Sward (percent) | Pencil | |
| Composition A | 1.1 | | 7H | 5 |
| Composition B | 1.0 | | 7H | 50 |
| Composition C | 0.9 | | 7H | 10–20 |

The nature of the present invention having been thus fully set forth, what is claimed as new and useful and desired to be secured by Letters Patent is:

1. A composition of matter consisting essentially of an oxidized polymer of a $C_4$ to $C_6$ conjugated diolefin containing 10 to 20% by weight of oxygen in its structure; and 2 to 15% by weight of a zinc salt of a tertiary tridecanoic acid.

2. A composition of matter consisting essentially of a polymer selected from the group consisting of an oxidized homopolymer of butadiene and an oxidized copolymer of butadiene with styrene, said polymer containing 10 to 20 weight percent of oxygen in its structure; and 2 to 15% by weight of a zinc salt of a tertiary tridecanoic acid.

3. The composition of matter according to claim 1 in which the polymer is the homopolymer of butadiene.

4. The composition of matter according to claim 1 in which the polymer is the copolymer of butadiene with styrene.

5. A supported film with improved impact resistance consisting essentially of an oxidized polymer of a $C_4$ to $C_6$ conjugated diolefin containing 10 to 20 weight percent of oxygen cured in the presence of 2 to 15 weight percent of a zinc salt of a tertiary tridecanoic acid.

6. A process which comprises preparing an oxidized polymer of a $C_4$ to $C_6$ conjugated diolefin which contains 10 to 20 weight percent of oxygen in its structure; adding 2 to 15 weight percent of a zinc salt of a tertiary tridecanoic acid; applying a coating to the surface of a base and subsequently curing by baking 3 to 60 minutes at a temperature between 250 and 500° F. to provide a film which has increased impact resistance.

7. The process according to claim 6 in which the polymer is the homopolymer of butadiene.

8. The process according to claim 6 in which the polymer is the copolymer of butadiene with styrene.

9. The process according to claim 6 in which the polymer is chemically modified by air blowing.

References Cited in the file of this patent

UNITED STATES PATENTS

| | | |
|---|---|---|
| 2,572,803 | Elliot et al. | Oct. 23, 1951 |
| 2,957,786 | Baumhart et al. | Oct. 25, 1960 |